(12) United States Patent
Nakajima et al.

(10) Patent No.: US 10,664,468 B2
(45) Date of Patent: May 26, 2020

(54) COMMUNICATION SUPPORTING DEVICE, METHOD, AND COMUPER PROGRAM

(71) Applicant: BELLFACE INC., Fukuoka (JP)

(72) Inventors: Kazuaki Nakajima, Fukuoka (JP); Satoshi Hashimoto, Fukuoka (JP)

(73) Assignee: Bellface Inc., Fukuoka (JP)

( * ) Notice: Subject to any disclaimer, the term of this patent is extended or adjusted under 35 U.S.C. 154(b) by 5 days.

(21) Appl. No.: 15/735,859

(22) PCT Filed: Jun. 10, 2016

(86) PCT No.: PCT/JP2016/067398
§ 371 (c)(1),
(2) Date: Dec. 12, 2017

(87) PCT Pub. No.: WO2016/199901
PCT Pub. Date: Dec. 15, 2016

(65) Prior Publication Data
US 2018/0173746 A1    Jun. 21, 2018

(30) Foreign Application Priority Data

Jun. 12, 2015  (JP) .................................. 2015-119486

(51) Int. Cl.
*G06F 16/23* (2019.01)
*G06F 16/954* (2019.01)
(Continued)

(52) U.S. Cl.
CPC .......... *G06F 16/2365* (2019.01); *G06F 16/27* (2019.01); *G06F 16/954* (2019.01);
(Continued)

(58) Field of Classification Search
None
See application file for complete search history.

(56) References Cited

U.S. PATENT DOCUMENTS

2006/0015763 A1    1/2006  Nakajima
2006/0053380 A1*   3/2006  Spataro .................. G06F 16/93
                                                        715/753
(Continued)

FOREIGN PATENT DOCUMENTS

JP    2001-344279 A1    12/2001
JP    2004-178268 A1     6/2004
(Continued)

*Primary Examiner* — Angela Nguyen
(74) *Attorney, Agent, or Firm* — Chris Mizumoto

(57) ABSTRACT

The present invention enables a predetermined user and a customer of the predetermined user to be easily associated, and to engage in communication having a shared web page, without installing dedicated software or the like.
A communication support device 1 generates, with a generating processor 13, a web page that is deployed on a mutually associated user terminal 2 and customer terminal 3, the web page having a shared web page that is shared by the user and the customer displayed within a predetermined display area. A transition history acquirer 14 acquires a transition history of the shared web pages from the mutually associated user terminal 2 and customer terminal 3, and on the basis of the transition history, when there is a transition of the shared web page on one of the mutually associated user terminal 2 or customer terminal 3, a synchronization processor 15 synchronizes the shared web page on the other terminal with a post-transition web page as a new shared web page.

9 Claims, 22 Drawing Sheets

(51) Int. Cl.
*G06F 16/955* (2019.01)
*G06F 16/958* (2019.01)
*G06F 16/27* (2019.01)
*H04L 29/08* (2006.01)

(52) U.S. Cl.
CPC .......... *G06F 16/955* (2019.01); *G06F 16/958* (2019.01); *H04L 67/025* (2013.01); *H04L 67/1095* (2013.01)

(56) References Cited

U.S. PATENT DOCUMENTS

| | | |
|---|---|---|
| 2007/0244970 A1 | 10/2007 | Watanabe et al. |
| 2008/0046333 A1* | 2/2008 | Kawakita ........... G06Q 10/0637 705/7.36 |
| 2013/0124361 A1* | 5/2013 | Bryson ................. G06Q 30/02 705/26.7 |
| 2014/0324624 A1* | 10/2014 | Ward ................... H04W 4/021 705/26.7 |
| 2015/0134742 A1 | 5/2015 | Ikeda et al. |
| 2016/0077706 A1* | 3/2016 | Haggar ................ G06F 3/0482 715/754 |

FOREIGN PATENT DOCUMENTS

| | | |
|---|---|---|
| JP | 2007-174253 A1 | 7/2007 |
| JP | 2007-280243 A1 | 10/2007 |
| JP | 2009-230592 A1 | 10/2009 |
| JP | 2014-191691 A1 | 10/2014 |
| JP | 2015-94970 A1 | 5/2015 |
| WO | WO2006-018877 A1 | 2/2006 |

* cited by examiner

| User ID | Authentication information | Detailed information |
|---|---|---|
| U0001 | ... | ... |
| ... | ... | ... |

Fig. 4

| User ID | Text data | Web page |
|---------|-----------|----------|
| U0001   | ...       | ...      |
| U0002   | ...       | ...      |
| ...     | ...       | ...      |

Fig. 5

| Communication ID | Customer terminal information | | User terminal information | | |
| --- | --- | --- | --- | --- | --- |
| | IP address | Port | User ID | IP address | Port |
| 1234 | · · · | · · · | · · · | · · · | · · · |

Fig. 6

| User ID | Text data | Web page | Reference data |
|---|---|---|---|
| U0001 | ⋮ | ⋮ ⋮ ⋮ | ⋮ ⋮ ⋮ |
| U0002 | ⋮ ⋮ | ⋮ ⋮ | ⋮ ⋮ |
| ... | ... | ... | ... |

Fig. 19

| User ID | Authentication information | Detailed information | Group ID |
|---|---|---|---|
| U0001 | ... | ... | G0001 |
| ... | ... | ... | ... |

Fig. 21

| Group ID | User ID | Text data | Web page | Reference data | Sharing flag |
|---|---|---|---|---|---|
| G0001 | U0001 | ... | ... | ... | YES |
| | | ... | ... | ... | |
| | | ... | ... | ... | |
| | U0002 | ... | ... | ... | NO |
| | | ... | ... | ... | YES |
| ... | ... | ... | ... | ... | ... |
| ... | ... | ... | ... | ... | ... |
| ... | ... | ... | ... | ... | ... |

Fig. 22

COMMUNICATION SUPPORTING DEVICE, METHOD, AND COMUPER PROGRAM

TECHNICAL FIELD

The present invention relates to a technology that readily associates a plurality of terminals with each other, and that enables communication that shares a web page between the associated terminals.

BACKGROUND ART

There is a broad supply of systems for sharing a web page or content in real time and conducting business discussions or a meeting on the basis of the web page or content. However, in the majority of these systems, a dedicated application or software must be introduced, and therefore the introduction of a usage environment for such systems must be requested of all parties conducting the business discussions or meeting.

In this regard, in Patent Document 1, a real time web sharing system is proposed which shares, in real time, a web page that is viewed on a plurality of terminal devices, and which is characterized by including: a server having a means for transmitting a detection script detecting an update of a web page and an update script updating the web page, and a means for transmitting update information that has been transmitted to the means from a predetermined terminal device, the information providing notification of the update of the web page, to another terminal device viewing the same web page as the predetermined terminal device; and a terminal device having a reception means receiving the detection script and the update script that are transmitted from the server, a means for causing the detection script received by the reception means to detect the update of the web page being viewed and, when an update occurs, generating and transmitting to the server update information providing notification of update results, and a means for causing the update script to update the web page on the basis of the update information received by the reception means.

An electronic catalog system has also been proposed in Patent Document 2 which is characterized by having a database that includes a moving image server accumulating moving image catalog information and a file server accumulating still image catalog information, and a terminal device connected to the database by a network, the terminal device being equipped with a means for simultaneously displaying on a display screen a moving image display portion and a still image display portion.

Still further, in Patent Document 3, a communication terminal is proposed that is characterized by having a means for uploading to a temporary server that temporarily retains information, a means for transmitting a URL of the information to a communication partner terminal, a means for receiving a download complete notification from the partner in communication terminal, and a means for issuing an instruction to delete the information uploaded to the temporary server when the download complete notification from the partner terminal is received.

PRIOR ART DOCUMENTS

Patent Documents

[Patent Document 1] Japanese Laid-open Patent Application No. 2004-178268
[Patent Document 2] Japanese Laid-open Patent Application No. 2001-344279
[Patent Document 3] Japanese Laid-open Patent Application No. 2007-174253

DISCLOSURE OF THE INVENTION

Problems the Invention is Intended to Solve

However, in the systems of Patent Documents 1 to 3 described above, for example, in order to establish communication between a customer and an operator, a dedicated web page for receiving a connection request from the customer must be prepared on the operator's end. In addition, such systems are for any one of a plurality of operators to respond to a single customer, and are not designed to allow a specific operator to respond to a specific customer, and do not include any means for doing so.

Given this, an object of the present invention is to enable a predetermined user and a customer of the predetermined user to be easily associated, and to enable the user and the customer to engage in communication having a shared web page, without installing a dedicated application or software.

Means for Solving the Aforementioned Problems

In order to achieve the above object, a communication support device according to one aspect of the present invention is a device configured to enable communication with a user terminal used by a user and a customer terminal used by a customer of the user over a network, and for engaging in communication having a web page shared on the user terminal and the customer terminal, the device being characterized by comprising: a setup information storage means mutually associating and storing the user terminal and the customer terminal; a generating processing means generating a web page deployed on the mutually associated user terminal and customer terminal, the web page having a shared web page that is shared by the user and the customer displayed within a predetermined display area; a transition history acquiring means acquiring, from the mutually associated user terminal and customer terminal, a transition history of the shared web page that is based on manipulation of the user or customer terminal; and a synchronization processing means that, on the basis of the transition history, when there is a transition of the shared web page on one of the mutually associated user terminal or customer terminal, synchronizes the shared web page on the other of the user terminal or customer terminal with a post-transition web page as a new shared web page.

The device may further comprise a text data storage means associating and storing user identification information for identifying the user and text data registered by the user, and a conversion processing means converting the text data into a web page that constitutes the shared web page. The generating processing means may be configured to generate a web page having, as the shared web page, a web page obtained by converting text data pertaining to a selection of the user from among the text data stored in the text data storage means.

The device may further comprise a reference data processing means referencing the text data storage means and deploying, on the user terminal, reference data that only the user can consult on the web page. The text data storage means may be configured to associate and store the user identification information for identifying the user, the text data registered by the user, and the reference data that only the user can consult.

The text data storage means may be configured to associate and store the user identification information for identifying the user, the text data registered by the user, the web page obtained by converting the text data, and the reference data that only the user can consult for each web page. The reference data processing means may be configured to reference the text data storage means and to deploy, on the web page on the user terminal, reference data associated with the shared web page within the web page.

The text data storage means may be configured to associate and store the user identification information for identifying the user, group identification information for identifying a group to which the user belongs, and the text data registered by the user. The generating processing means may be configured to generate a web page having, as the shared web page, a web page obtained by converting text data stored in the text data storage means and registered by the user, as well as text data pertaining to a selection of the user from among text data registered by another user belonging to the same group as the group to which the user belongs.

The text data storage means may be configured to associate and store the user identification information for identifying the user, the group identification information for identifying the group to which the user belongs, the text data registered by the user, and a sharing flag indicating sharing permission for the text data. The generating processing means may be configured to generate a web page having, as the shared web page, a web page obtained by converting text data stored in the text data storage means and registered by the user, as well as text data pertaining to a selection of the user from among the text data registered by another user belonging to the same group as the group to which the user belongs and for which sharing is permitted.

The device may further comprise a terminal manipulation information acquiring means for acquiring terminal manipulation information of the user and the customer from the user terminal and the customer terminal; and a reproduction processing means that, on the basis of the terminal manipulation information, reproduces on one terminal a change that is based on manipulation of the other terminal by the user or the customer.

The reproduction processing means may be configured to reproduce, on the basis of the terminal manipulation information, the change that is based on manipulation of the one terminal by the user or the customer on the other terminal with a condition that enables distinction from a terminal manipulation on the other terminal.

The device may further comprise a note data processing means for deploying, on the user terminal and the customer terminal, note data that both the user and the customer can edit.

The device may further comprise a live information processing means for acquiring live information of the user and the customer from one of the user terminal and the customer terminal, and outputting the live information on the other terminal.

In addition, a communication support method according to another aspect of the present invention is a method configured to enable communication with a user terminal used by a user and a customer terminal used by a customer of the user over a network, and for engaging in communication having a web page shared on the user terminal and the customer terminal with a computer having a setup information storage means mutually associating and storing the user terminal and the customer terminal, the method being characterized in that the computer executes: a process for generating a web page deployed on the mutually associated user terminal and customer terminal, the web page having a shared web page that is shared by the user and the customer displayed within a predetermined display area; a process for acquiring, from the mutually associated user terminal and customer terminal, a transition history of the shared web page that is based on manipulation of the user or customer terminal; and a process that, on the basis of the transition history, when there is a transition of the shared web page on one of the mutually associated user terminal or customer terminal, synchronizes the shared web page on the other of the user terminal or customer terminal with a post-transition web page as a new shared web page.

In addition, a computer program according to still another aspect of the present invention is a computer program configured to enable communication with a user terminal used by a user and a customer terminal used by a customer of the user over a network, and for causing a computer having a setup information storage means mutually associating and storing the user terminal and the customer terminal to function as a communication support device for engaging in communication having a web page shared on the user terminal and the customer terminal, the program executing, on the computer: a process for generating a web page deployed on the mutually associated user terminal and customer terminal, the web page having a shared web page that is shared by the user and the customer displayed within a predetermined display area; a process for acquiring, from the mutually associated user terminal and customer terminal, a transition history of the shared web page that is based on manipulation of the user or customer terminal; and a process that, on the basis of the transition history, when there is a transition of the shared web page on one of the mutually associated user terminal or customer terminal, synchronizes the shared web page on the other of the user terminal or customer terminal with a post-transition web page as a new shared web page.

Effect of the Invention

According to the present invention, the mutually associated user and customer can engage in communication having a shared web page, without installing a dedicated application or software.

In addition, because the shared web page is synchronized, the user and the customer can communicate while continuously consulting the same web page.

BRIEF DESCRIPTION OF THE DRAWINGS

FIG. 4 is an exemplary view of data stored in a user information storage portion of the communication support device according to the first embodiment.

FIG. 5 is an exemplary view of data stored in a text data storage portion of the communication support device according to the first embodiment.

FIG. 6 is an exemplary view of data stored in a setup information storage portion of the communication support device according to the first embodiment.

FIG. 19 is an exemplary view of data stored in a text data storage portion of the communication support device according to the second embodiment.

FIG. 21 is an exemplary view of data stored in a user information storage portion of a communication support device according to a third embodiment of the present invention.

FIG. 22 is an exemplary view of data stored in a text data storage portion of the communication support device according to the third embodiment of the present invention.

BEST MODE FOR CARRYING OUT THE INVENTION

Hereafter, communication support devices according to embodiments of the present invention are described with reference to the drawings.

Figure 1:
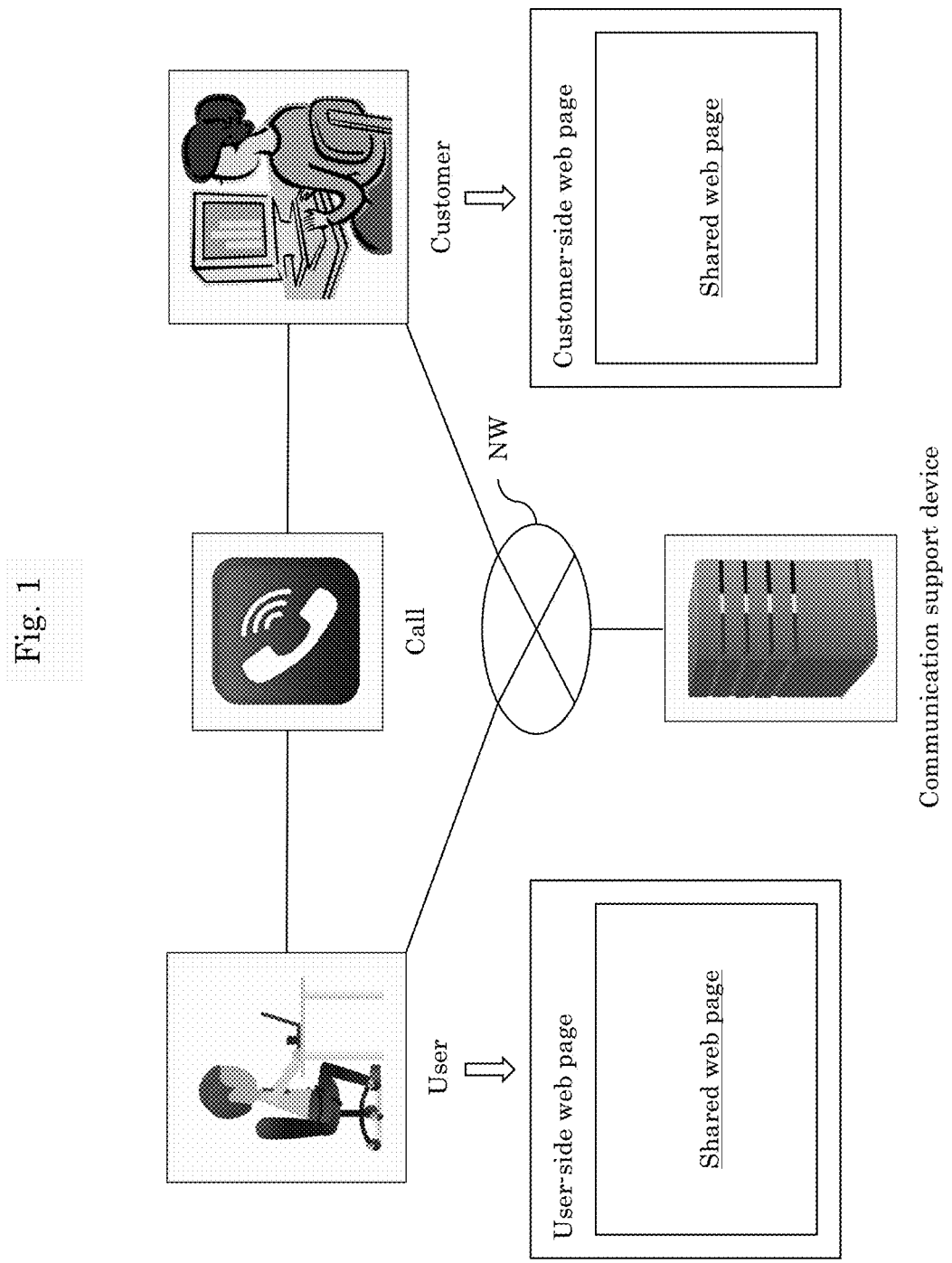
FIG. 1 is a schematic diagram illustrating an overview of a service provided by communication support devices according to embodiments of the present invention.

First, an overview of a service provided by a communication support device according to the embodiments (hereafter referred to as "the service") is described with reference to FIG. 1.

The service provides a user of the service and a customer of the user with a place for communication that shares a web page. A scenario is imagined where the user engages in communication with the customer while each consults a web page for product descriptions or the like on the user's and the customer's respective terminals.

The web page shared by the user and the customer is text data such as an explanatory document converted into a web page, and is displayed in a predetermined display area of a web page deployed on the user terminal and the customer terminal (in the description that follows, the identical web page which the user and the customer consult in this way is referred to as a "shared web page"). The shared web page is synchronized on the respective terminals used on the user side and the customer side, and business discussions, product descriptions, and the like are carried out while consulting an explanatory document that has been configured as the shared web page.

Here, a description is provided of a flow when the service is initiated, in which the user, who has been in communication with the customer through a telephone call, first obtains the customer's consent to use the service. Once the user has obtained the consent, the user requests that the customer acquire a communication ID from a predetermined web page, the communication ID distinguishing the communication between the parties from communication between other parties. In response, the customer has the communication support device issue a communication ID, and acquires the communication ID. At this point, the communication support device mutually associates and stores the communication ID and an IP address that can identify the customer terminal.

Once the user has asked the customer for the communication ID over the phone, the user requests, from the user terminal, that the communication support device initiate communication with the customer terminal associated with the communication ID. In response, the communication support device specifies the customer terminal associated with the communication ID, then associates the customer terminal with the user terminal.

When the user terminal and the customer terminal are associated, a web page provided with the shared web page is deployed on both terminals. The shared web pages are synchronized, and the user and the customer are able to conduct business discussions, product descriptions, and the like while consulting identical shared web pages throughout.

Example 1

Figure 2:
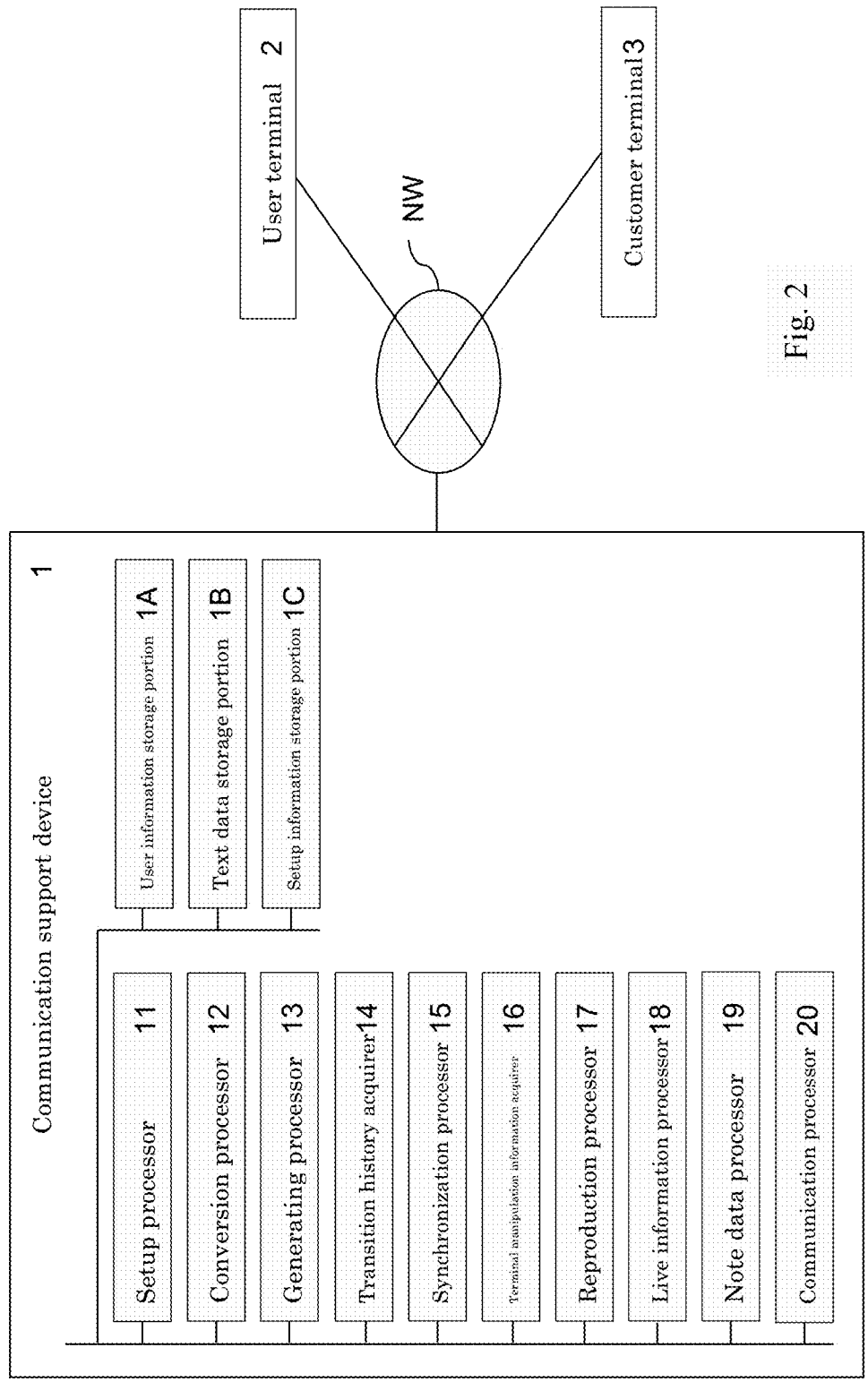
FIG. 2 is a functional block diagram indicating functions provided to a communication support device according to a first embodiment of the present invention.

Next, functions provided to a communication support device 1 according to a first embodiment of the present invention are described in detail with reference to FIG. 2.

The communication support device 1 is a device enabling communication in which a web page is shared between a user terminal 2 used by a user of the service and a customer terminal 3 used by a customer of the user. The communication support device 1 is configured to be capable of communicating with the user terminal 2 and the customer terminal 3 via a network NW, such as the Internet.

The communication support device 1 is provided with a computation device such as a central processing unit (CPU), a computer program executed by the CPU, internal memory such as random access memory (RAM) or read-only memory (ROM), and the like, and configures functional blocks comprising a setup processor 11, a conversion processor 12, a generating processor 13, a transition history acquirer 14, a synchronization processor 15, a terminal manipulation information acquirer 16, a reproduction processor 17, a live information processor 18, a note data processor 19, a communication processor 20, a user information storage portion 1A, a text data storage portion 1B, and a setup information storage portion 1C.

The setup processor 11 sets up an association between the user terminal 2, which uses the service to engage in communication, and the customer terminal 3.

Using, inter alia, an IP address of the customer terminal 3, the setup processor 11 specifies the customer terminal 3 designated by the user, then associates the specified customer terminal 3 with the user terminal 2 and stores information regarding the association in the setup information storage portion 1C.

In a specific example of the association process, first, distinctive communication IDs are issued to the user and the customer who are to be newly associated, and the communication ID is associated with the IP address of the customer terminal 3 acquired from the customer terminal 3 of the customer, and the associated communication ID and IP address are stored in the setup information storage portion 1C. When a request to begin providing the service between the user terminal 2 and the customer terminal 3 that is associated with the predetermined communication ID is received from the user terminal 2, the setup information storage portion 1C is referenced and the user terminal 2 is associated with the customer terminal 3 that is associated with the predetermined communication ID. After the user terminal 2 and the customer terminal 3 have been associated, data communication between the two terminals is executed through socket communication.

The conversion processor 12 executes a process converting text data the user has registered in the text data storage portion 1B into a web page that constitutes the shared web page.

Here, the text data, when registered by the user, comprises a predetermined document format, and the conversion processor 12 converts the text data into a web page that can be referenced by a browser. In this example, when the text data is configured by a plurality of pages, the text data is converted into a plurality of web pages having an individual URL assigned to each page.

The generating processor 13 generates a web page which is deployed on the mutually associated user terminal 2 and customer terminal 3, the web page having the shared web page that is shared by the user and the customer displayed within a predetermined display area of the web page.

More specifically, the generating processor 13 provides the predetermined display area, achieved using an inline frame, in an HTML file corresponding to the web page to be transmitted to the user terminal 2 and the customer terminal 3, and inserts the HTML file of the shared web page in the display area. Accordingly, a web page is generated having the shared web page displayed in the predetermined display area.

Figure 3:
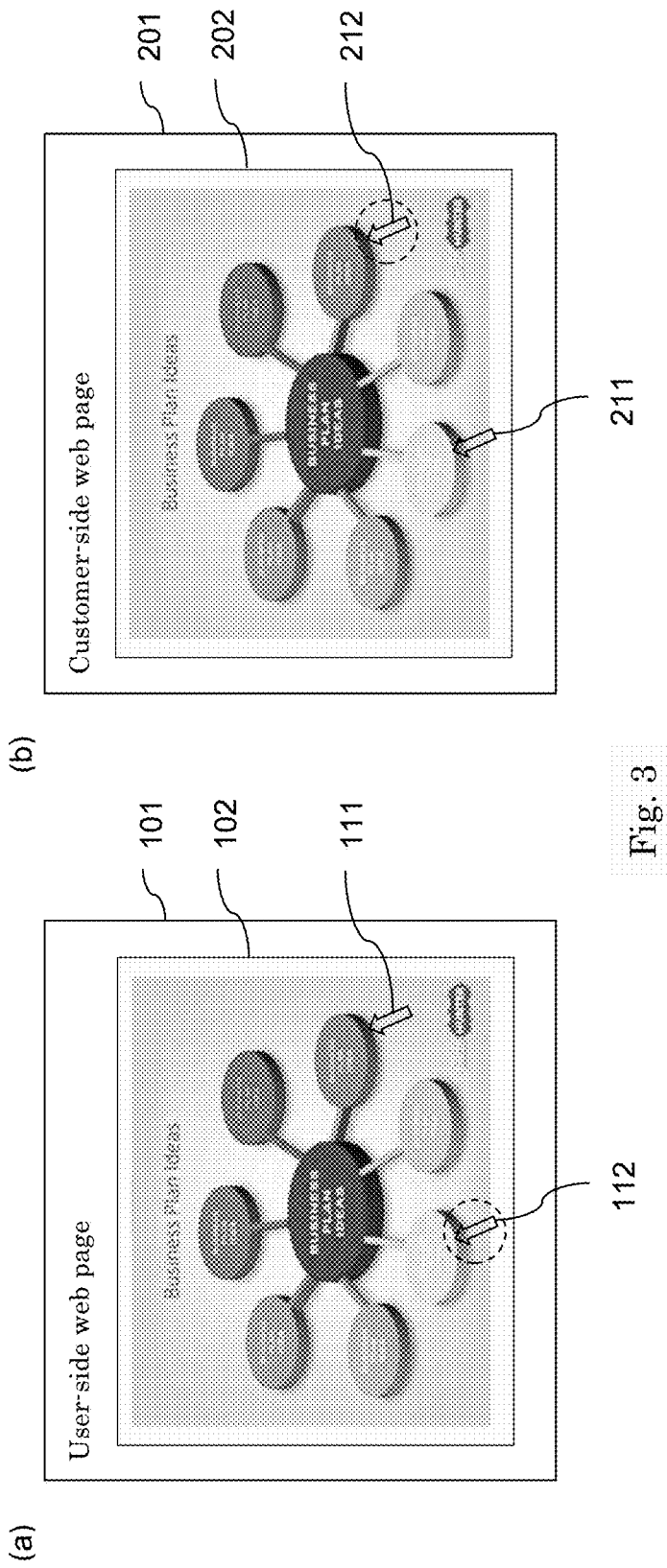
FIG. 3 is an exemplary view of web pages provided by the communication support device according to the first embodiment, where (a) is a user-side web page and (b) is a customer-side web page.
Figure 7:
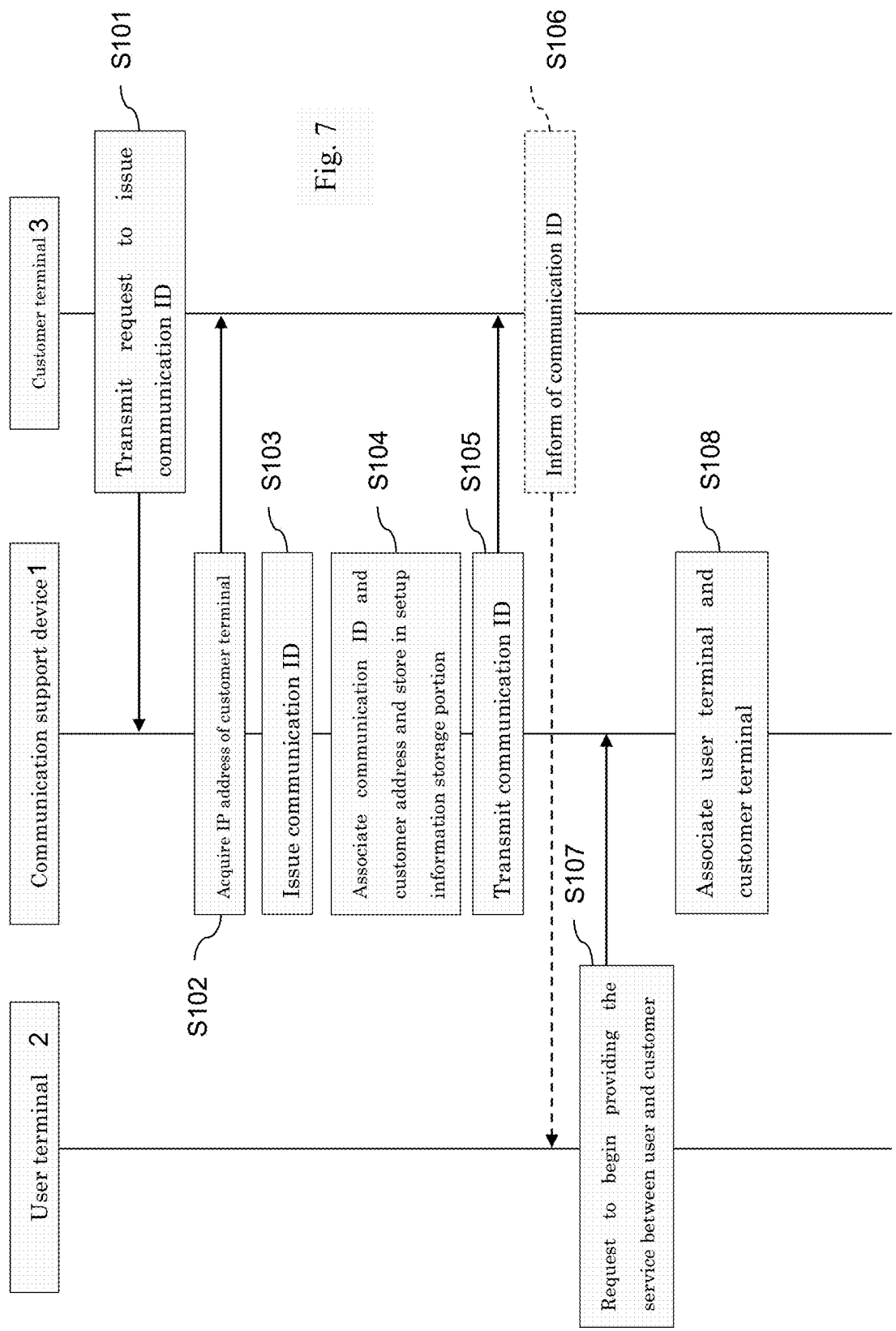
FIG. 7 is a sequence diagram illustrating a procedural flow of setting up an association between a user terminal and a customer terminal in the communication support device according to the first embodiment.

Here, an exemplary web page that is generated by the generating processor 13 is depicted in FIG. 3.

A user-side web page 101 and a customer-side web page 201 are each web pages that are assigned unique URLs. The user-side web page 101 and the customer-side web page 201 are provided with respective display areas 102 and 202 for displaying shared web pages 102a and 202a.

The shared web pages 102a and 202a displayed in the display areas 102 and 202 are synchronized by the synchronization processor 15, described below, and the user and the customer can communicate while consulting identical shared web pages to which identical URLs have been assigned.

The transition history acquirer 14 acquires, from the user terminal 2 and the customer terminal 3, a transition history of the shared web page that is based on manipulation of a terminal by the user or the customer.

By performing regular polling and analyzing JavaScript (registered trademark) installed in the browsers of the user terminal 2 and customer terminal 3, the transition history acquirer 14 acquires the transition history of the shared web pages from the user terminal 2 and the customer terminal 3.

The synchronization processor 15 synchronizes the shared web pages that are deployed between the mutually associated user terminal 2 and customer terminal 3, and enables the user and the customer to consult identical shared web pages.

Specifically, on the basis of the transition history acquired by the transition history acquirer 14, when there is a transition of the shared web page on one of the user terminal 2 or the customer terminal 3, the shared web page on the other terminal is synchronized with the post-transition web page as a new, shared web page.

The terminal manipulation information acquirer 16 acquires, from the user terminal 2 and the customer terminal 3, terminal manipulation information of the user and the customer. Here, the terminal manipulation information of the present example is information such as mouse coordinates or a scroll position, which correspond to manipulation of a pointing device such as a mouse at each terminal.

On the basis of the terminal manipulation information acquired by the terminal manipulation information acquirer 16, when a change based on manipulation of a terminal is detected on one of the user terminal 2 or the customer terminal 3, the reproduction processor 17 reproduces on the other terminal the detected change that is based on the manipulation of the terminal.

Here, a description of the process performed by the reproduction processor 17 is described with reference to FIG. 3. A cursor 111 indicating a position of the mouse manipulated by the user and a cursor 112 indicating a position of the mouse manipulated by the customer are displayed on the user-side web page 101. Meanwhile, a cursor 211 indicating the position of the mouse manipulated by the customer and a cursor 212 indicating the position of the mouse manipulated by the user are similarly displayed on the customer-side web page 201.

The cursor 111 or 211 indicating the position of the operator's own mouse and the cursor 112 or 212 indicating the position of the other party's mouse are displayed on both the user side and the customer side, and the display is configured to enable identification of which party's mouse position is indicated by a cursor. In this example, a circle of dashed lines surrounds only the cursors 112 and 212, which indicate the position of the other party's mouse, but so long as there is a condition that enables identification, this can be accomplished via various conditions, such as changing the color of the cursors.

For example, when the cursor 111 displaces in response to the user manipulating the mouse, a change accompanying the displacement of the cursor 111 is detected by the reproduction processor 17 on the basis of the terminal manipulation information acquired by the terminal manipulation information acquirer 16. On the basis of the terminal manipulation information, the reproduction processor 17 moves the cursor 212, which indicates the position of the user's mouse on the customer-side web page 201, exactly as the cursor 111 moved on the user-side web page 101 and reproduces the movement of the cursor 111 on the customer-side web page 201.

Accordingly, the user or the customer can communicate with an understanding of the other party's manipulation of a terminal.

When the user terminal 2 and the customer terminal 3 are provided with an input means such as a web cam or microphone, the live information processor 18 acquires from one terminal live information pertaining to video or audio that is input to the web cam or microphone, and transmits the live information to the other terminal. On the other terminal, the video or audio is output by an output means such as a display or a speaker.

The note data processor 19 deploys, on the user terminal 2 and the customer terminal 3, note data that both the user and the customer can edit. The note data is freely edited by the user and the customer, and identical content is always displayed on the user side and the customer side.

After the service ends, for example, the note data edited by the user and the customer can be saved to a predetermined database or the like for later reference.

The communication processor 20 executes a process of transmitting data over the network NW (for example, the Internet) between the user terminal 2 and the customer terminal 3.

Through the communication processor 20, the communication support device 1 establishes a session between the user terminal 2 and the customer terminal 3, enabling the transmission and reception of data necessary to synchronize the shared web pages on both terminals, for example.

The user information storage portion 1A is a storage portion storing information about the user of the service provided by the communication support device 1 according to the present embodiment.

For example, as illustrated in FIG. 4, authentication information for authenticating the user, and other detailed information about the user (such as the user's name and contact information), is associated with a user ID for identifying the user and is stored in the user information storage portion 1A.

The text data storage portion 1B is a storage portion storing text data such as a document prepared by the user.

Figure 5:
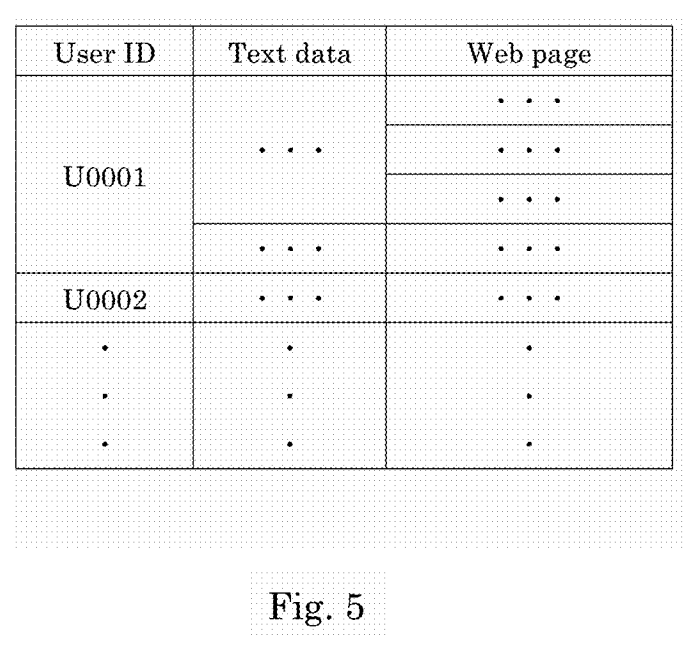

For example, as illustrated in FIG. 5, text data registered by the user and a web page obtained by converting text data that comprises a predetermined file format are associated with the user ID identifying the user and are stored in the text data storage portion 1B.

The text data is data such as an explanatory document which the user uses during communication with the customer, and comprises a predetermined document format.

The web page is a web page configuring the shared web page and is obtained by converting text data with the conversion processor 12. When the text data comprises a plurality of pages, the web page is configured by a plurality of web pages having a distinctive URL assigned to each page of the text data.(*1)

In the present example, at the time the text data is registered by the user, the text data is converted to a web page by the conversion processor 12, and the web page is associated with the text data and registered in the text data storage portion 1B. In a different example, a web page can instead be generated by the generating processor 13 and when the shared web page is shared by the user and the customer, the conversion processor 12 can convert target text data to a web page.

The setup information storage portion 1C is a storage portion storing information pertaining to a process executed by the setup processor 11, the information pertaining to setting up the association between the user terminal 2 and the customer terminal 3.

For example, as illustrated in FIG. 6, the communication ID, customer terminal information, and user terminal information are associated with each other and stored in the setup information storage portion 1C.

The communication ID is identification information distinctive to the service that is newly provided to a predetermined user and customer. When associating the user and the customer, the communication ID is used to specify the customer with whom the user requests association.

The customer terminal information is configured by the IP address or port number of the customer terminal 3, and includes information necessary to establish a session with the customer terminal 3 and to perform socket communication.

The user terminal information includes, in addition to the user ID of the user, information necessary to perform socket communication, such as the IP address or port number of the user terminal 2.

By consulting the setup information storage portion 1C, the mutually associated user and customer can be specified, and a session can be established to allow data transmission.

In the present example, a configuration is also possible where, when setting up the association between the user and the customer using the setup processor 11, information regarding usage environments of the user terminal 2 and the customer terminal 3 is acquired and stored in the setup information storage portion 1C. The "usage environments of the user terminal 2 and the customer terminal 3" refers to information regarding the type of operating system (OS) of each terminal, devices such as a web cam or microphone and presence of drivers to operate these devices, and the like. By consulting this information, the user can establish communication that is responsive to the usage environment of the other party's terminal.

The user terminal 2 is a terminal used by the user of the service provided by the communication support device 1 according to the present embodiment, and is a terminal for the user to establish communication with the customer.

The user terminal 2 is configured by a so-called personal computer or tablet terminal, a portable telephonic terminal capable of data transmission, or the like, and includes functional parts such as an input/output processor (reduced to practice by a display, speaker, keyboard, touchscreen, pointing device, headset, or the like) and a communication processor such as a browser for performing data transmission and reception.

The customer terminal 3 is a terminal used by the user's customer.

Similar to the user terminal 2, the customer terminal 3 is also configured by a so-called personal computer or tablet terminal, a portable telephonic terminal capable of data transmission, or the like, and includes functional parts such as an input/output processor (reduced to practice by a display, speaker, keyboard, touchscreen, pointing device, or the like) and a communication processor such as a browser for performing data transmission and reception.

Next, a procedural flow executed by the communication support device 1 according to the present embodiment is described.

First, with reference to FIG. 6, a description is provided of an exemplary process up to a point where the predetermined user terminal 2 and customer terminal 3 are associated by the setup processor 11.

Before beginning, the user logs in to a prepared user-facing website of the service using predetermined authentication information, and makes preparations so as to be able to request a predetermined process from the communication support device 1.

The user of the service, who has been in communication with the customer via telephone, remains on the telephone to request that the customer of the user acquire a communication ID from the communication support device 1 in order to communicate with the customer through the service.

The customer accesses the communication support device 1 from the predetermined web page and requests that the communication support device 1 issue a communication ID (S101), whereupon an issue communication ID request is transmitted from the customer terminal 3 to the communication support device 1 (S102).(*2)

The communication support device 1 receives the issue communication ID request from the customer terminal 3,(*3) then acquires the IP address of the customer terminal 3 (S102) and issues the communication ID, which is configured by a four-digit number or the like (S103).

The issued communication ID is associated with the IP address of the customer terminal 3 and is stored in the setup information storage portion 1B (S104).

When the customer is issued the communication ID from the communication support device 1 (S105), the customer verbally informs the user of the communication ID over the telephone (S106).

Using the user terminal 2, the user transmits the communication ID given by the customer to the communication support device 1, and also transmits a request to begin providing the service between the user and the customer that has been associated with the communication ID (S107).

In response, the communication support device 1 specifies the customer terminal 3 that has been associated with the communication ID, then associates the specified customer terminal 3 with the user terminal 2 and registers the association information in the setup information storage portion 1C (S108).

Figure 8:
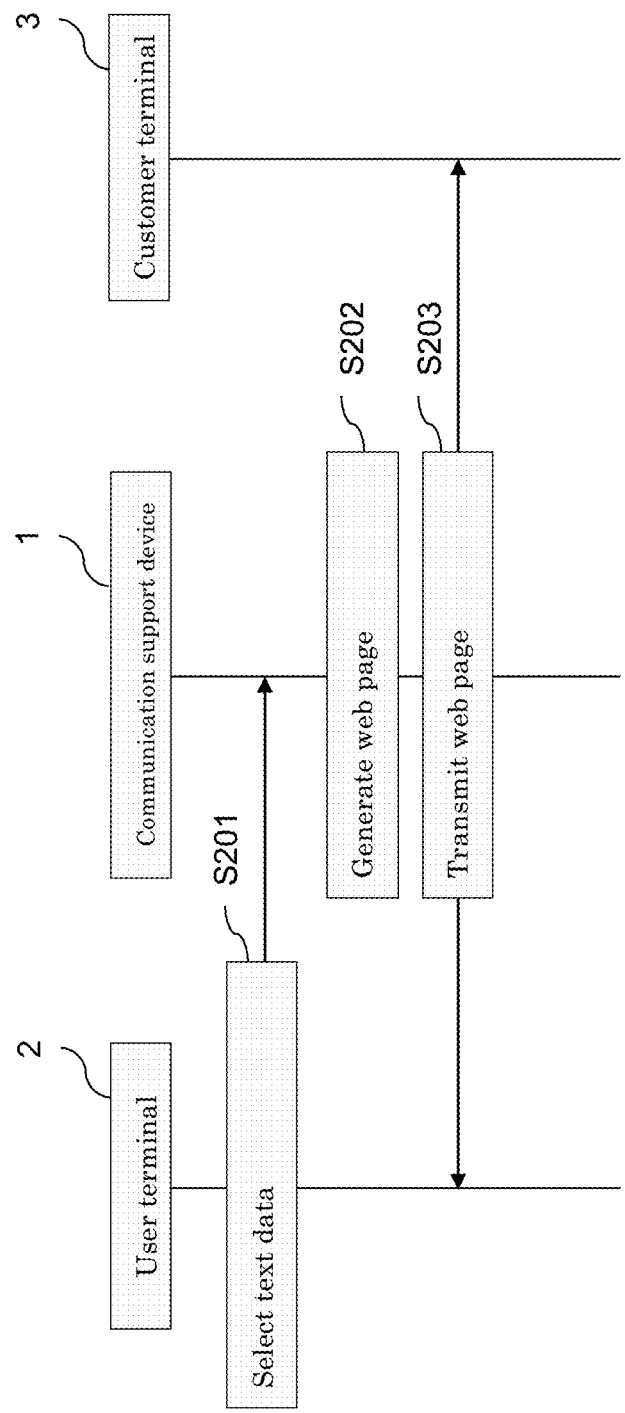
FIG. 8 is a sequence diagram illustrating a procedural flow when a web page having a shared web page is provided to a user and a customer in the communication support device according to the first embodiment.

Next, with reference to FIG. 8, a description is given of a process after the association of the user terminal 2 and the customer terminal 3 has been set up, up to a point where the web page provided with the shared web page is deployed on the user terminal 2 and the customer terminal 3.

Before beginning, the user registers the text data the user wishes to share with the customer in the text data storage portion 1B. The registered text data is converted to a web page by the conversion processor 12 of the communication support device 1 and is stored in the text data storage portion 1B.

The user selects desired text data from the text data that was registered ahead of time in the text data storage portion 1B (S201).

In response, the generating processor 13 generates a web page displaying, as the shared web page, the web page corresponding to the text data selected by the user, within a predetermined display area (S202).

The generated web page is transmitted to the user terminal 2 and the customer terminal 3, and is deployed on the user terminal 2 and the customer terminal 3 (S203).

When the web page provided with the shared web page is deployed on the user terminal 2 and the customer terminal 3, processes pertaining to synchronizing the shared web pages on both terminals and to reproducing the manipulation of the terminals are executed concurrently.

Figure 9:
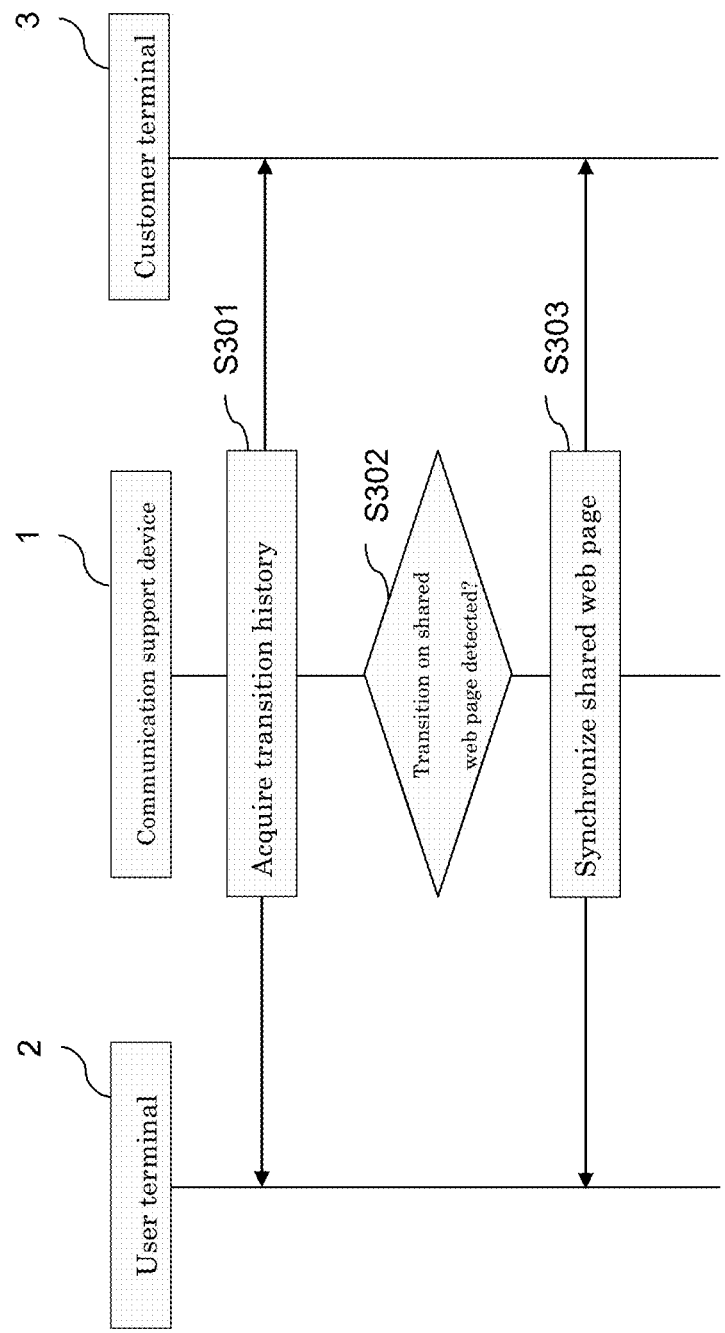
FIG. 9 is a sequence diagram illustrating a procedural flow of synchronizing the shared web page in the communication support device according to the first embodiment.

First, a shared web page synchronization process is described with reference to FIG. 9.

The transition history acquirer 14 acquires, from the mutually associated user terminal 2 and customer terminal 3, the transition history of the shared web page that is based on manipulation of the user or customer terminal (S301).

The transition history of the shared web page is acquired by performing regular polling and analyzing JavaScript (registered trademark) installed in the browsers of the user terminal 2 and customer terminal 3.

On the basis of the transition history acquired by the transition history acquirer 14, the synchronization processor 15 determines whether a transition of the shared web page has occurred on the user terminal 2 or the customer terminal 3 (S302).

As a result, when a transition of the shared web page is detected on one of the terminals, the shared web page on the other terminal is synchronized with the post-transition web page as a new, shared web page (S303).

Figure 10:
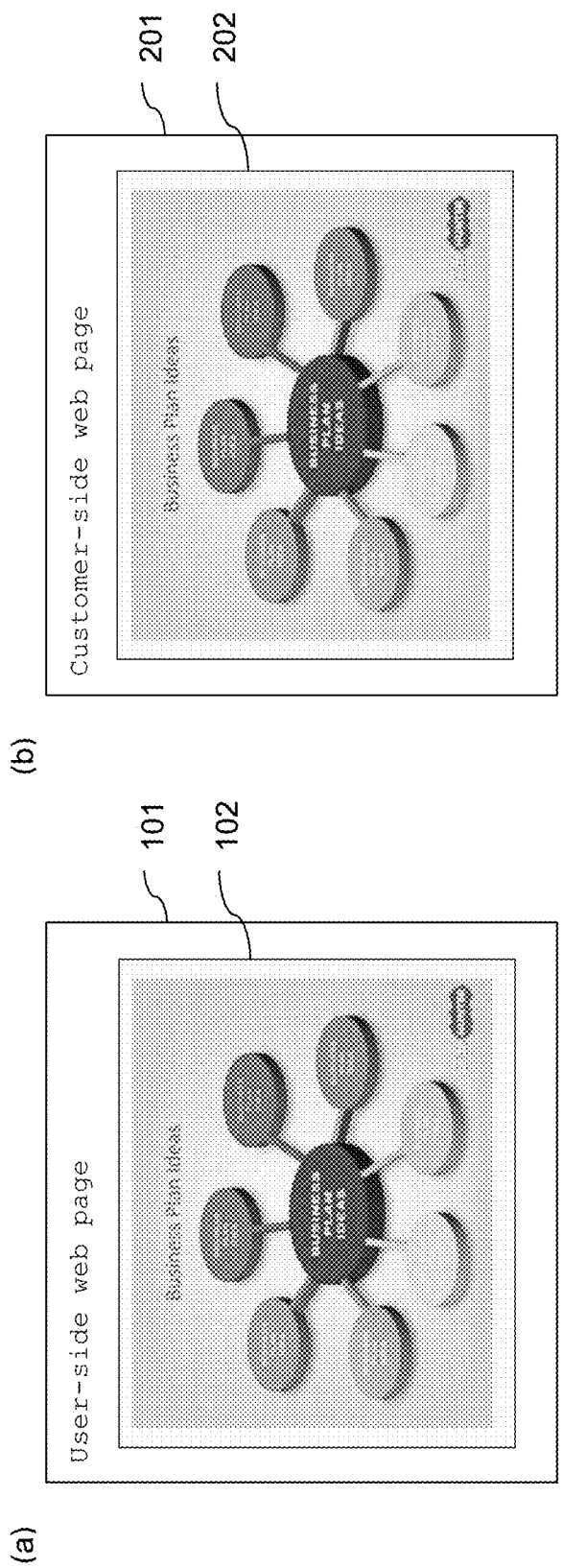
FIG. 10 is an exemplary view of screen images that are deployed on the user terminal and the customer terminal in the shared web page synchronization process performed by the communication support device according to the first embodiment, where (a) is an exemplary screen image on the user terminal and (b) is an exemplary screen image on the customer terminal.
Figure 11:
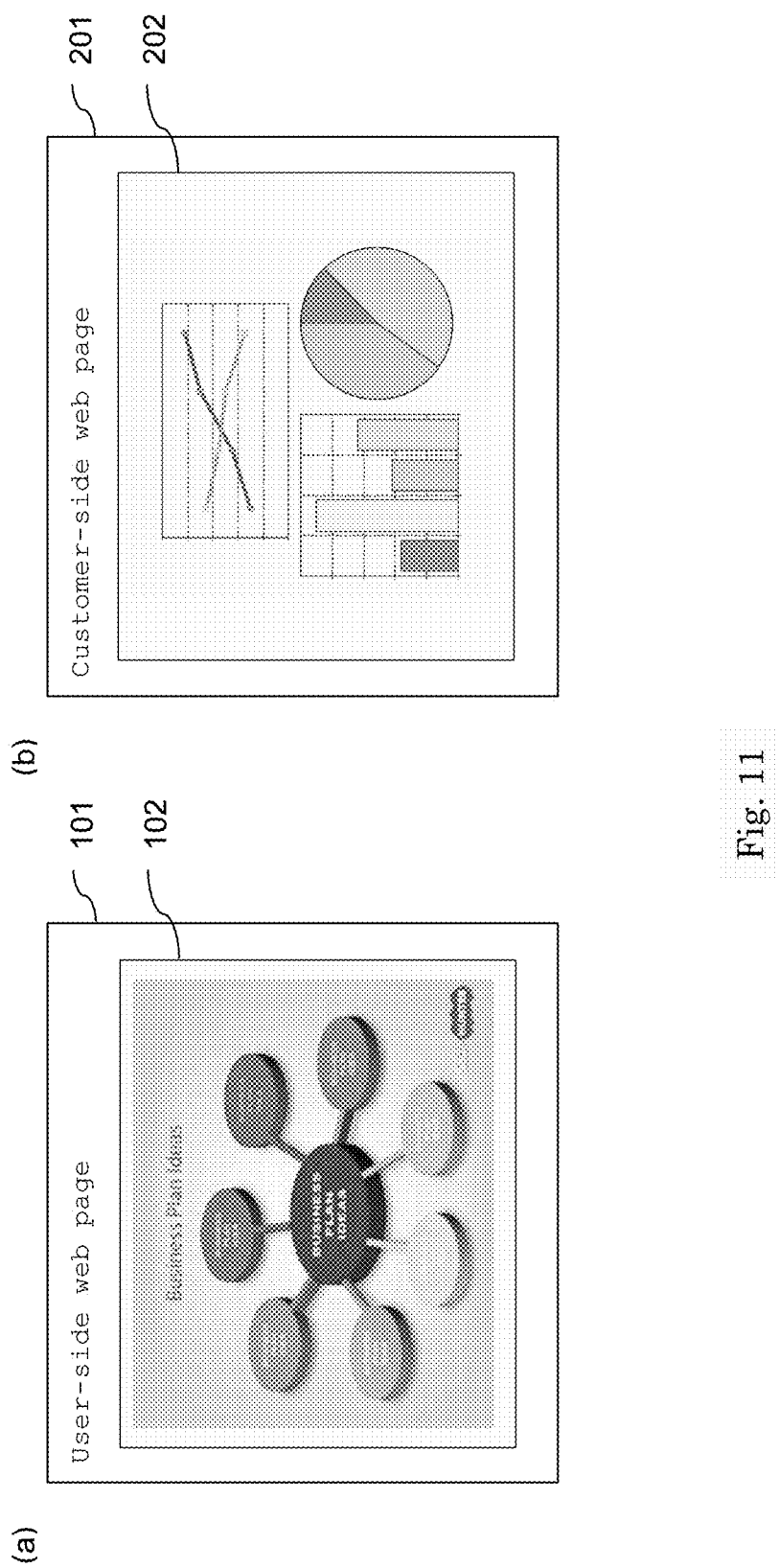
FIG. 11 is an exemplary view of screen images that are deployed on the user terminal and the customer terminal in the shared web page synchronization process performed by the communication support device according to the first embodiment, where (a) is an exemplary screen image on the user terminal and (b) is an exemplary screen image on the customer terminal.
Figure 12:
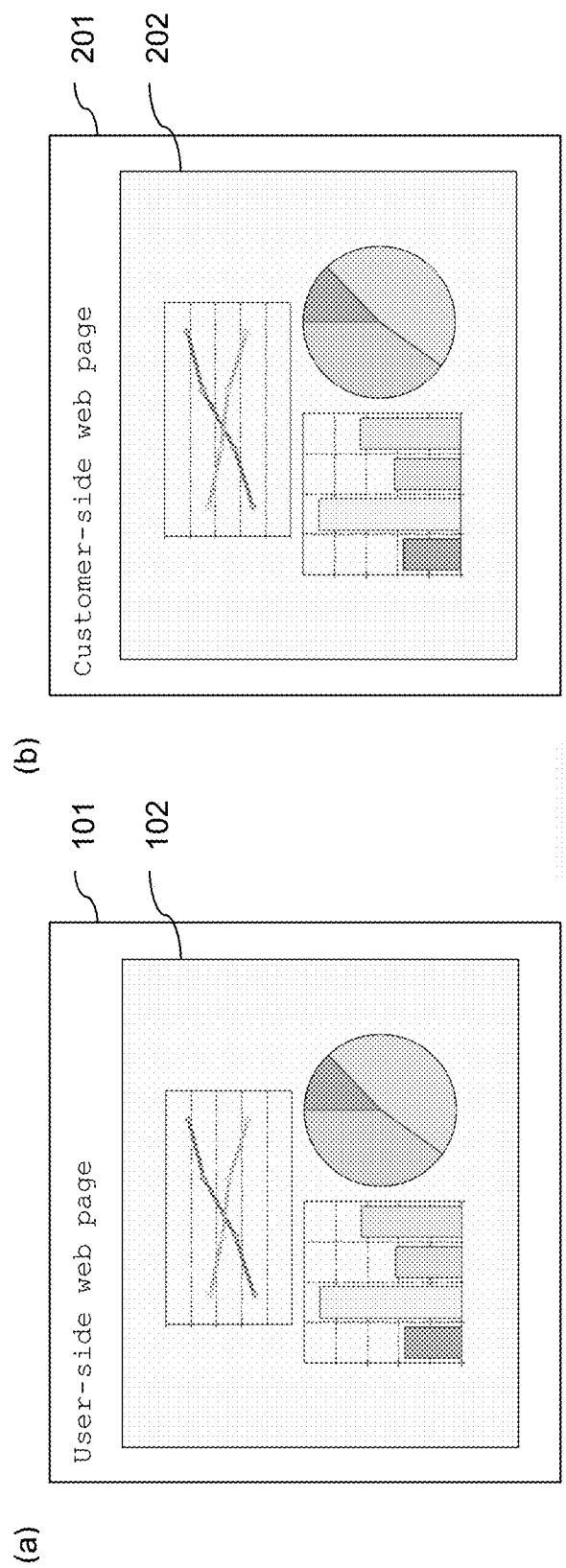
FIG. 12 is an exemplary view of screen images that are deployed on the user terminal and the customer terminal in the shared web page synchronization process performed by the communication support device according to the first embodiment, where (a) is an exemplary screen image on the user terminal and (b) is an exemplary screen image on the customer terminal.

Here, a flow of the transition of the shared web pages on the user terminal 2 and the customer terminal 3 in the shared web page synchronization process is illustrated in FIGS. 10 to 12.

First, as depicted in FIG. 10, the web pages 101 and 201 are deployed to the user terminal 2 and the customer terminal 3, respectively, and the identical shared web pages 102a and 202a(*4) are displayed in the respective display areas 102 and 202 of the web pages 101 and 201.

In one example, as illustrated in FIG. 11, when the customer-side shared web page 202a transitions from a previous web page to a new web page due to manipulation by the customer, the synchronization processor 15 detects this transition of the shared web page 202a on the basis of the transition history acquired by the transition history acquirer 14.

By detecting the transition of the shared web page 202a, as illustrated in FIG. 12, the synchronization processor 15 synchronizes the shared web page 102a in the user-side display area 102 with the new, post-transition web page as the shared web page.

A case where a transition of the shared web page 102a occurs on the user side is treated similarly, and the customer-side shared web page 202a is synchronized.

Accordingly, the shared web pages that are deployed between the mutually associated user terminal 2 and customer terminal 3 can be synchronized, and business discussions or the like can be conducted while the user and the customer consult identical shared web pages.

Figure 13:
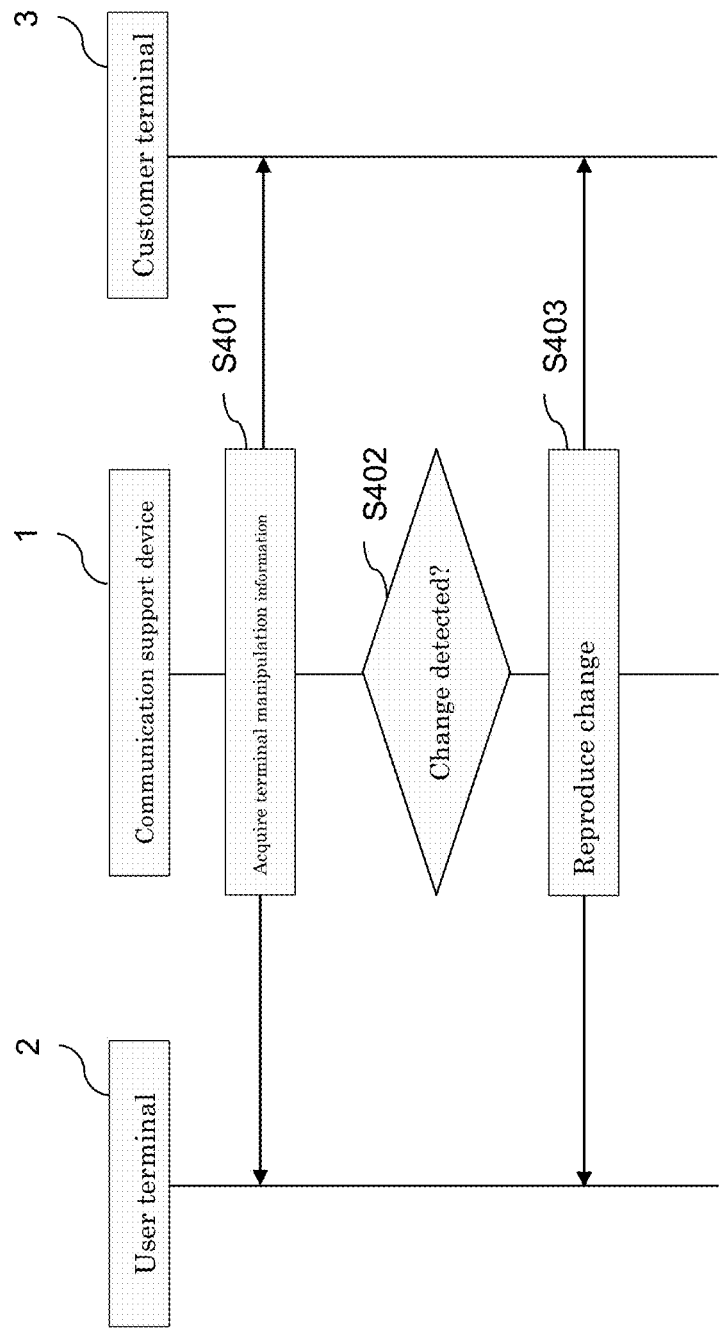
FIG. 13 is a sequence diagram illustrating a procedural flow of reproducing manipulation of a terminal in the communication support device according to the first embodiment.

Next, a process pertaining to reproducing the manipulation of a terminal is described with reference to FIG. 13.

The terminal manipulation information acquirer 16 regularly acquires, from the user terminal 2 and the customer terminal 3, information regarding terminal manipulation by the user or the customer (S401).

On the basis of the terminal manipulation information acquired by the terminal manipulation information acquirer 16, the reproduction processor 17 determines whether a change based on manipulation of a terminal has occurred on the user terminal 2 or the customer terminal 3 (S402).

As a result, when a change based on manipulation of a terminal is detected on one of the user terminal 2 or the customer terminal 3, the reproduction processor 17 reproduces on the other terminal the detected change that is based on the manipulation of the terminal (S403).

Figure 14:
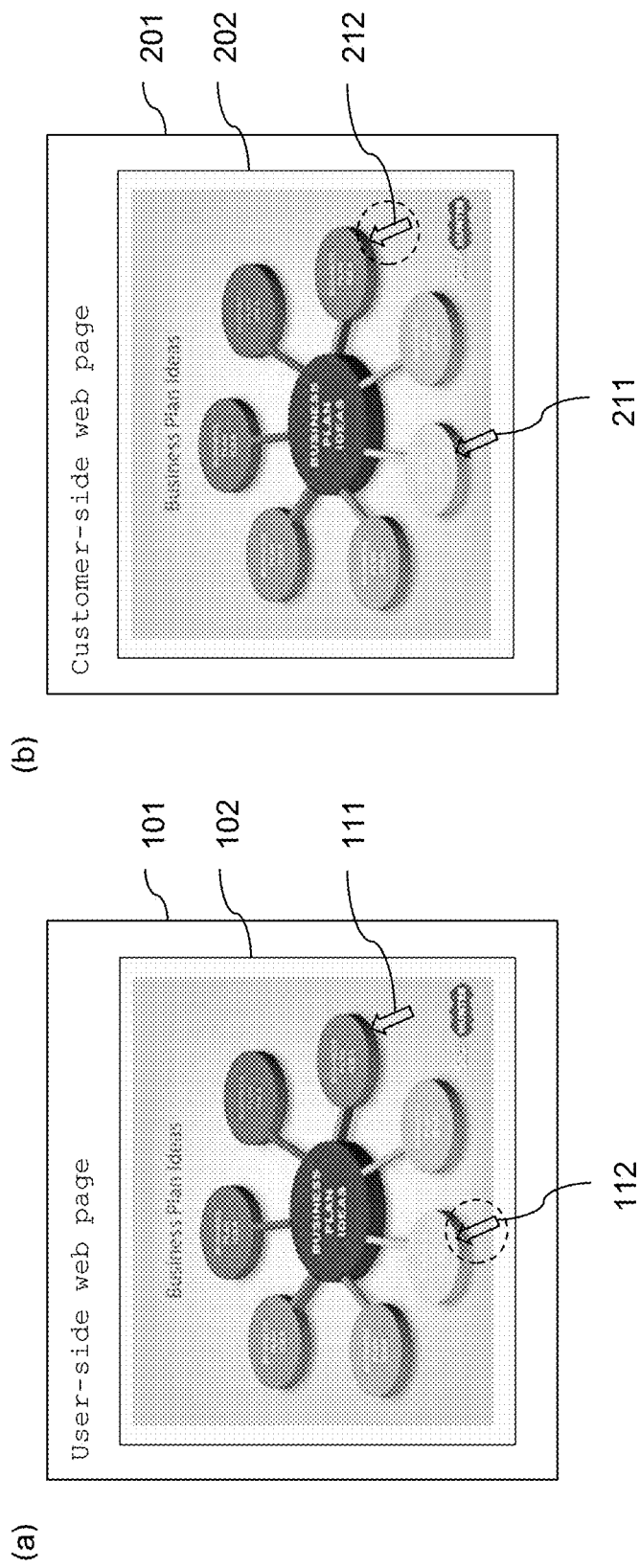
FIG. 14 is an exemplary view of screen images that are deployed on the user terminal and the customer terminal in the terminal manipulation reproduction process performed by the communication support device according to the first embodiment, where (a) is an exemplary screen image on the user terminal and (b) is an exemplary screen image on the customer terminal.
Figure 15:
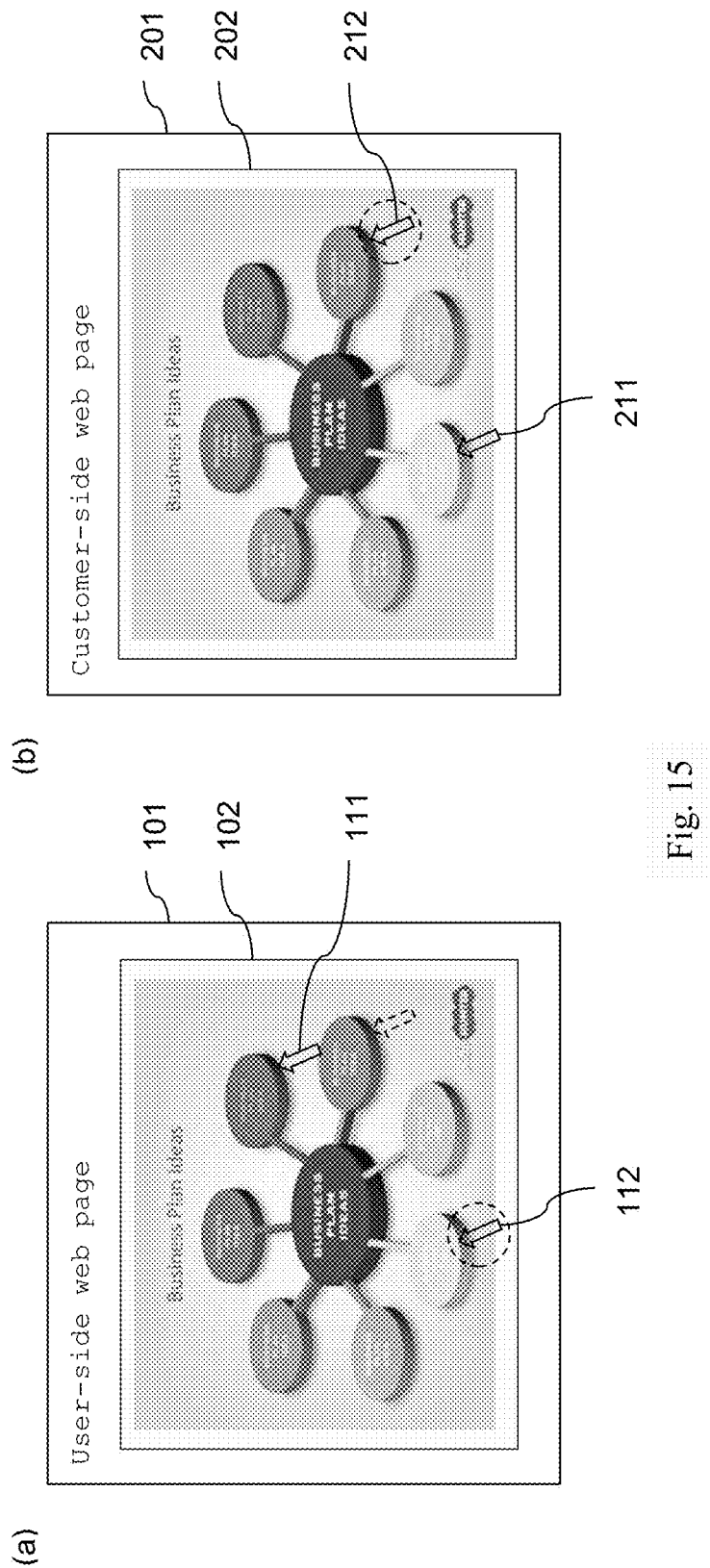
FIG. 15 is an exemplary view of screen images that are deployed on the user terminal and the customer terminal in the terminal manipulation reproduction process performed by the communication support device according to the first embodiment, where (a) is an exemplary screen image on the user terminal and (b) is an exemplary screen image on the customer terminal.
Figure 16:
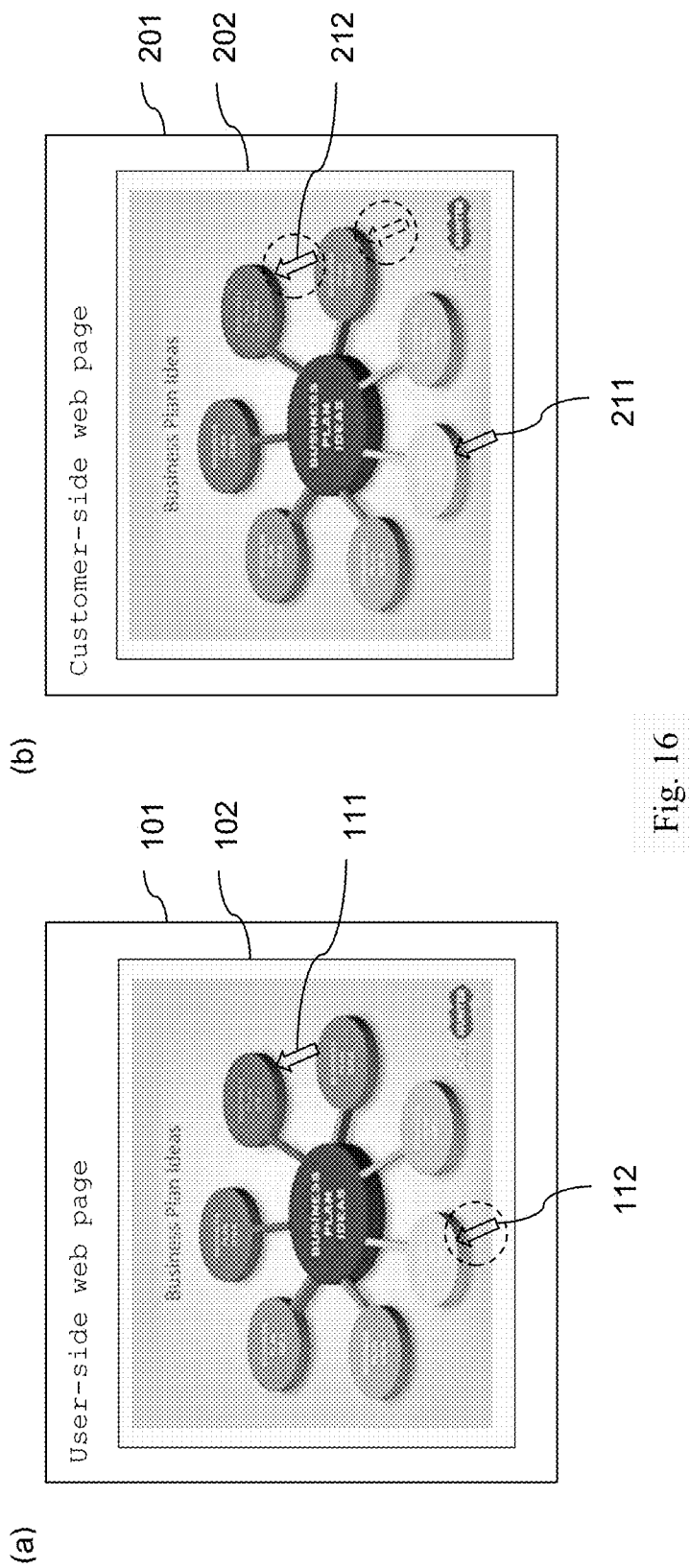
FIG. 16 is an exemplary view of screen images that are deployed on the user terminal and the customer terminal in the terminal manipulation reproduction process performed by the communication support device according to the first embodiment, where (a) is an exemplary screen image on the user terminal and (b) is an exemplary screen image on the customer terminal.

Here, a flow of the reproduction of the change that is based on the manipulation of the terminal on the user terminal 2 and the customer terminal 3 in the terminal manipulation reproduction process is illustrated in FIGS. 14 to 16.

First, as depicted in FIG. 14, the cursor 111 indicating the position of the mouse manipulated by the user and the cursor 112 indicating the position of the mouse manipulated by the customer are displayed on the web page 101 on the user terminal 2. Meanwhile, the cursor 211 indicating the position of the mouse manipulated by the customer and the cursor 212 indicating the position of the mouse manipulated by the user are similarly displayed on the customer-side web page 201.

In this example, in order to enable identification of which party's mouse position is indicated by a cursor, a circle of dashed lines surrounds only the cursors 112 and 212, which indicate the position of the other party's mouse.

In one example, as illustrated in FIG. 15, when the cursor 111 displaces in response to the user manipulating the mouse (in FIG. 15, the cursor depicted with a dashed line indicates an original position of the cursor 111, but this is merely to facilitate description and no such cursor is actually displayed), the displacement of the cursor 111 that is based on the terminal manipulation information is detected by the reproduction processor 17 on the basis of the terminal manipulation information acquired by the terminal manipulation information acquirer 16.

The change that is based on the user's manipulation of a terminal is detected, whereby, as illustrated in FIG. 16, on the basis of the terminal manipulation information, the reproduction processor 17 moves the cursor 212, which indicates the position of the user's mouse on the customer-side web page 201, exactly as the cursor 111 moved on the user-side web page 101 and reproduces the movement of the cursor 111 on the customer-side web page 201. (In FIG. 16, the cursor depicted with a dashed line indicates an original position of the cursor 212, but this is merely to facilitate description and no such cursor is actually displayed.)

A case where the cursor 211 is displaced on the customer-side web page 201 is treated similarly, and the displacement is reproduced for the customer's cursor 112 displayed on the user-side web page 101.

Accordingly, the manipulation of one of the user terminal 2 or the customer terminal 3 is faithfully reproduced on the other terminal, and therefore the user or the customer can communicate with an understanding of the other party's manipulation of a terminal.

Figure 17:
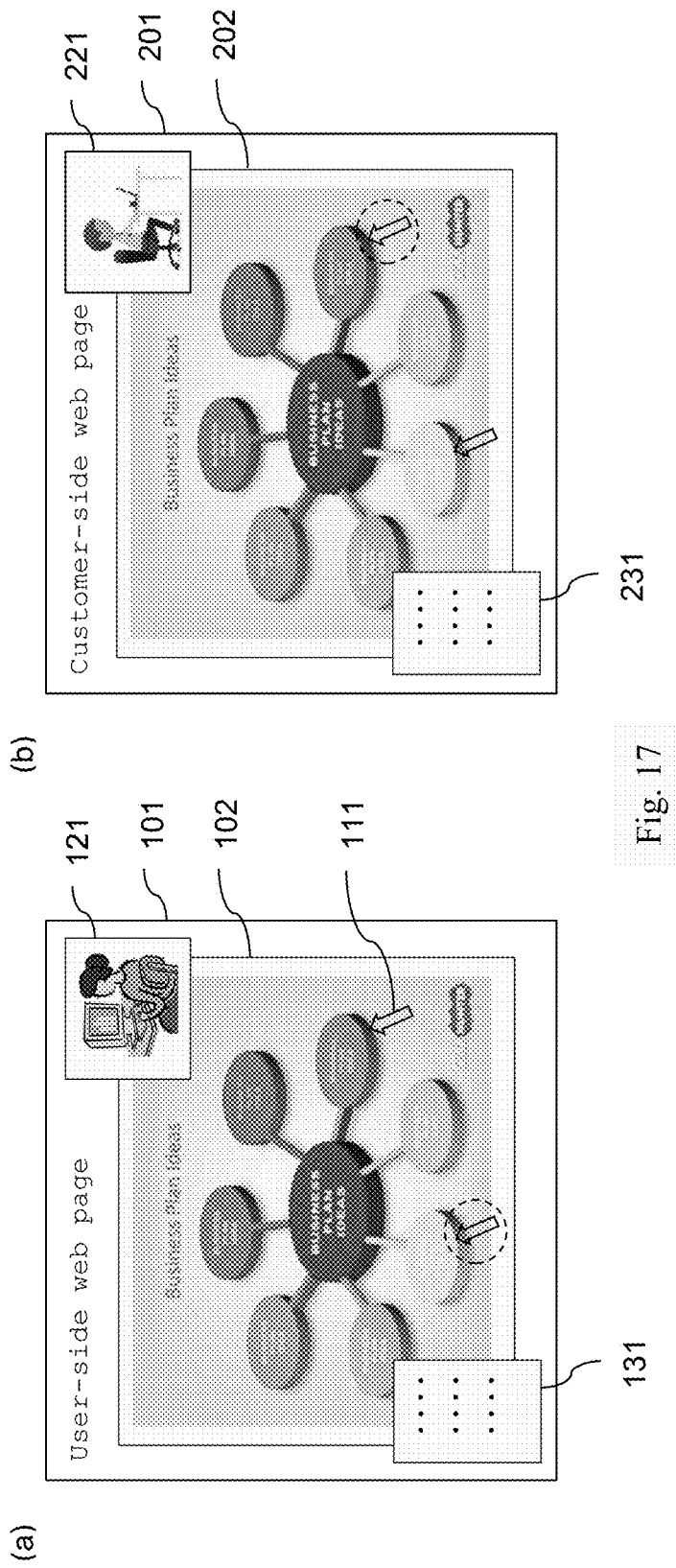
FIG. 17 is an exemplary view of screen images for when additional functions pertaining to transmission of live information and deployment of note data are deployed on the user terminal and the customer terminal by the communication support device according to the first embodiment, where (a) is an exemplary screen image on the user terminal and (b) is an exemplary screen image on the customer terminal.

Next, a description is given, with reference to FIG. 17, of a function that is achieved by the live information processor 18 and the note data processor 19, and that renders communication through the service still more convenient.

When the user terminal 2 and the customer terminal 3 are provided with an external input means such as a web cam or microphone, the live information processor 18 acquires live information pertaining to video or audio that is input to the external input means of one terminal, and transmits the live information to the other terminal.

As depicted in FIG. 17, video display fields 121 and 221 are provided, respectively, to the user-side web page 101 and the customer-side web page 201 by executing the function of the live information processor 18. The live information processor 18 displays, in the user-side video display field 121, video of the customer acquired from the customer terminal 3 and also displays, in the customer-side video display field 221, video of the user acquired from the user terminal 2. In addition, the audio information acquired from the other party-side terminal can be output through a speaker or the like provided to each terminal.

The video that is provided as live information may also be configured to switch to a preregistered profile image in response to poor conditions in the network NW.

Furthermore, by executing the function of the note data processor 19, note data display fields 131 and 231 are provided, respectively, to the user-side web page 101 and the customer-side web page 201, and the note data processor 19 edits note data in response to an input operation by the user and the customer. The note data display fields 131 and 231 can be edited from both the user terminal 2 and the customer terminal 3, and always display the same content.

After the service ends, for example, the note data edited by the user and the customer can be saved to a predetermined database or the like for later reference.

According to the communication support device 1 according to the present embodiment, described above, the mutually associated user and customer can engage in communication having a shared web page, without installing a dedicated application or software.

In addition, because the shared web page is synchronized, the user and the customer can communicate while continuously consulting the same web page.

Example 2

Next, a communication support device according to a second embodiment of the present invention is described.

The communication support device according to the present embodiment displays, on a user-side web page, reference data that only the user can consult, and enables the user to engage in communication with a customer while consulting the reference data.

Figure 18:
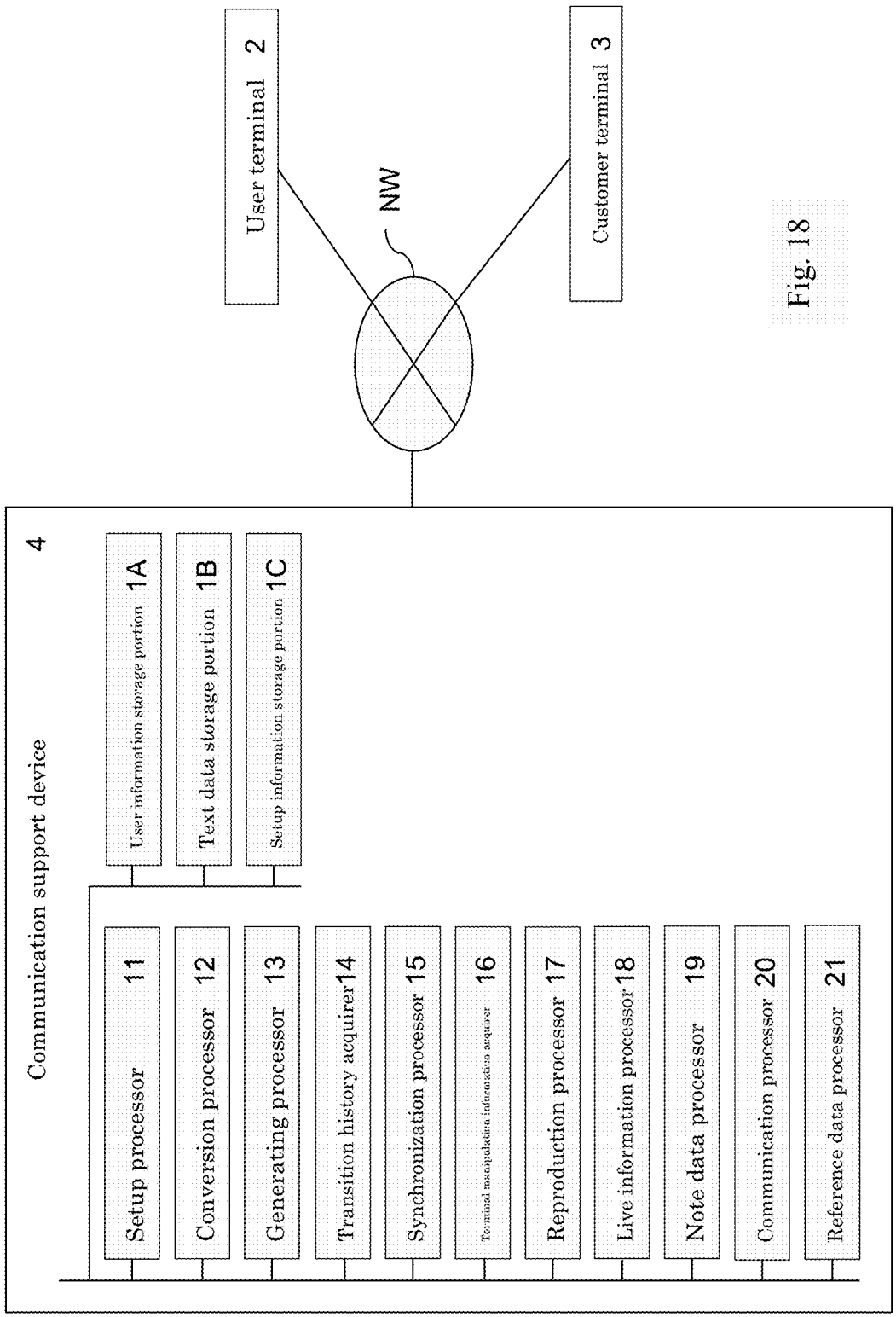
FIG. 18 is a functional block diagram indicating functions provided to a communication support device according to a second embodiment of the present invention.

As depicted in FIG. 18, a communication support device 4 according to the present embodiment is configured to be capable of communicating with the user terminal 2 and the customer terminal 3 over the network NW (for example, the Internet), similarly to the communication support device 1 according to the first embodiment.

Using a computation device such as a central processing unit (CPU), a computer program executed by the CPU, internal memory such as random access memory (RAM) or read-only memory (ROM), and the like, the communication support device 4 configures a reference data processor 21, in addition to the setup processor 11, the conversion processor 12, the generating processor 13, the transition history acquirer 14, the synchronization processor 15, the terminal manipulation information acquirer 16, the reproduction processor 17, the live information processor 18, the note data processor 19, the communication processor 20, the user information storage portion 1A, the text data storage portion 1B, and the setup information storage portion 1C that are provided to the communication support device 1 according to the first embodiment.

As depicted in FIG. 19, text data registered by the user, a web page obtained by converting text data comprising a predetermined file format, and reference data for each web page are associated with the user ID for identifying the user and are stored in the text data storage portion 1B of the present embodiment.

The reference data is data registered as desired by the user, and examples may include a descriptive manual for an associated web page, or the like.

When the shared web page is deployed on the user terminal 2 and the customer terminal 3, the reference data processor 21 displays the reference data associated with the shared web page on the user-side web page.

Figure 20:
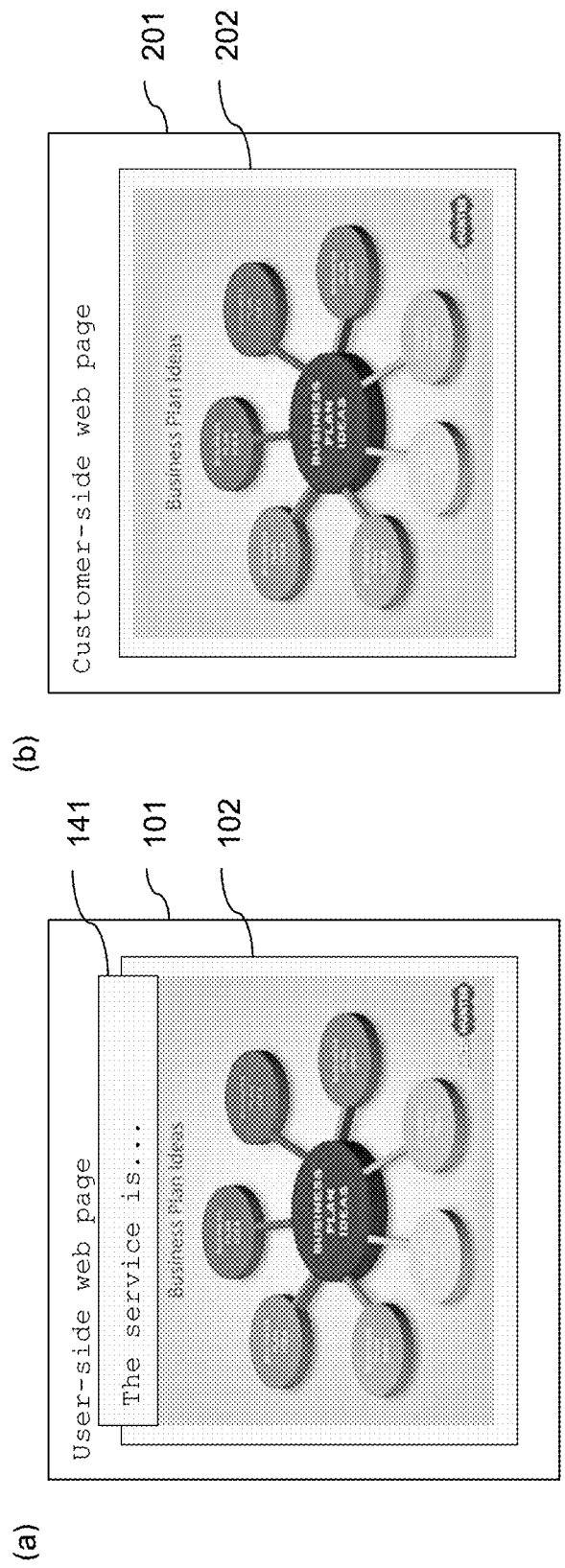
FIG. 20 is an exemplary deployment of reference data performed by the communication support device according to the second embodiment, where (a) is an exemplary screen image on the user terminal and (b) is an exemplary screen image on the customer terminal.

An example where the reference data is displayed on the user's web page by executing the function of the reference data processor 21 is depicted in FIG. 20.

Reference data 141 that is associated with the shared web page 102a in the text data storage portion 1B is displayed on the user-side web page 101, together with the shared web page 102a(*5). The reference data processor 21 extracts the reference data associated with the web page configuring the shared web page 102a from the text data storage portion 1B in response to deployment or transition of the shared web page 102a displayed in the display area 102, and displays the extracted reference data on the user-side web page 101.

The reference data 141 is displayed only on the user-side web page 101 and is not displayed on the customer-side web page 201. Therefore, the user can conduct business discussions with the customer, give product descriptions, or the like based on the shared web page while a manual or the like for providing explanations to the customer is displayed on the web page 101 as the reference data 141, for example, which is convenient.

Example 3

Next, a communication support device according to a third embodiment of the present invention is described.

The communication support device according to the present embodiment enables text data that a predetermined user has registered to be shared with another user within a predetermined group to which the predetermined user belongs and can, for example, share text data within a company to which the users belong.

The communication support device according to the present embodiment is configured to be capable of communicating with the user terminal 2 and the customer terminal 3 over the network NW (for example, the Internet), similarly to the communication support device 1 according to the first embodiment, and is provided with functional blocks pertaining to the setup processor 11, the conversion processor 12, the generating processor 13, the transition history acquirer 14, the synchronization processor 15, the terminal manipulation information acquirer 16, the reproduction processor 17, the live information processor 18, the note data processor 19, the communication processor 20, the user information storage portion 1A, the text data storage portion 1B, and the setup information storage portion 1C.

However, as illustrated in FIG. 21, the user ID for identifying the user, the authentication information for authenticating the user, and other detailed information about the user (such as the user's name and contact information), as well as a group ID identifying a group to which the user belongs are all mutually associated and stored in the user information storage portion 1A of the present embodiment.

The group ID can, for example, be issued for a company or each department to which the user belongs, or for each appropriate group.

In addition, as depicted in FIG. 22, text data registered by the user, the web page obtained by converting the text data comprising a predetermined file format, the reference data for each web page, and a sharing flag indicating sharing permission for the text data are associated with the user ID identifying the user and are stored in the text data storage portion 1B of the present embodiment.

A sharing permission flag is a flag indicating whether or not sharing predetermined text data within the group to which the user belongs is permitted, and is set by the user who registers the text data. Text data for which sharing is permitted can be used by another user in the group to which the user belongs.

In this example, when sharing of the text data is permitted by the sharing flag, sharing is also permitted for the reference data associated with the text data, but nevertheless, a configuration is also possible where a separate sharing flag can be provided for the reference data and the sharing permission can be set.

In the present embodiment, when the user communicates with the customer while consulting the shared web page, a web page corresponding not only to the text data registered by the user, but also to text data registered by another user belonging to the same group as the group to which the user belongs and for which sharing is permitted, can be selected from the text data stored in the text data storage portion 1B and used as the shared web page. In this connection, the generating processor 13 generates a web page having, as the shared web page, the web page corresponding to the text data for which sharing is permitted, in accordance with a selection of the user.

According to the communication support device according to the present embodiment, text data can be shared with each predetermined group, such as company or department, to which the user belongs and therefore, for example, product descriptions or the like that are based on unified documents for the company or each department can be provided to the customer, which is convenient.

In the communication support device according to the above embodiment, editing rights for the text data or reference data may also be set, and only a predetermined user may be allowed to perform editing.

REFERENCE SIGNS LIST

1 Communication support device
11 Setup processor
12 Conversion processor
13 Generating processor 14 Transition history acquirer
15 Synchronization processor
16 Terminal manipulation information acquirer
17 Reproduction processor
18 Live information processor
19 Note data processor
20 Communication processor
21 Reference data processor
1A User information storage portion
1B Text data storage portion
1C Setup information storage portion
2 User terminal
3 Customer terminal
4 Communication support device
NW Network

The invention claimed is:

1. A communication support device for enabling communication with a user terminal used by a user and a customer terminal used by a customer of the user over a network, and for engaging in communication having a shared web page shared on the user terminal and the customer terminal, the device comprising:
 a text data storage means for associating and storing user identification information for identifying the user, text data registered by the user, the shared web page obtained by converting selected text data selected from the text data by the user, and reference data that only the user can consult for each web page;
 a conversion processing means for converting the selected text data into the shared web page shared on the user terminal and the customer terminal;
 a setup information storage means for mutually associating the user terminal and the customer terminal and storing information on the association of the two;
 a generating processing means for generating a web page deployed on the user terminal and the customer terminal that are mutually associated, the web page including the shared web page shared on the user terminal and the customer terminal, displayed within a predetermined display area;
 a transition history acquiring means for acquiring a transition history of the shared web page that is based on manipulation of the user terminal or the customer terminal by performing regular polling and analyzing JavaScript installed in browsers of the user terminal and the customer terminal that are mutually associated;
 a synchronization processing means that, on the basis of the transition history, when there is a transition of the shared web page on one of the user terminal or the customer terminal, synchronizes the shared web page on the other of the user terminal or the customer terminal with a post-transition web page as a new shared web page; and
 a reference data processing means for referencing the text data storage means and deploying, on the web page on the user terminal, the reference data that are associated with the shared web page within the web page.

2. The communication support device according to claim 1, wherein the text data storage means further associates and stores group identification information for identifying a group to which the user belongs, and
 the generating processing means further generates another selected text data selected by the user from among the text data registered by another user belonging to the same group as the group to which the user belongs.

3. The communication support device according to claim 1, wherein the text data storage means further associates and stores the group identification information for identifying the group to which the user belongs, and a sharing flag indicating permission to share the text data, and
 the generating processing means further generates another selected text data selected by the user from among the text data registered by another user belonging to the same group as the group to which the user belongs and for which sharing is permitted.

4. The communication support device according to claim 1, further comprising:
 a terminal manipulation information acquiring means for acquiring terminal manipulation information of the user and the customer from the user terminal and the customer terminal; and
 a reproduction processing means that, on the basis of the terminal manipulation information, reproduces on one terminal a change that is based on manipulation of the other terminal by the user or the customer.

5. The communication support device according to claim 1, further comprising a note data processing means for deploying, on the user terminal and the customer terminal, note data that both the user and the customer can edit.

6. The communication support device according to claim 1, further comprising a live information processing means for acquiring live information of the user and the customer from one of the user terminal and the customer terminal, and outputting the live information on the other terminal.

7. The communication support device according to claim 4, wherein the reproduction processing means reproduces, on the basis of the terminal manipulation information, the change that is based on manipulation of the one terminal by the user or the customer on the other terminal with a condition that enables distinction from a terminal manipulation on the other terminal.

8. A communication support method for enabling communication with a user terminal used by a user and a customer terminal used by a customer of the user over a network, and for engaging in communication having a shared web page shared on the user terminal and the customer terminal with a computer comprising:
 a text data storage means for associating and storing user identification information for identifying the user, text data registered by the user, the shared web page obtained by converting selected text data selected from the text data by the user, and reference data that only the user can consult for each web page; and
 a setup information storage means for mutually associating the user terminal and the customer terminal and storing information on the association of the two,
the method comprising:
 a process for converting the selected text data selected from the text data by the user into the shared web page shared on the user terminal and the customer terminal;
 a process for generating a web page deployed on the user terminal and the customer terminal that are mutually associated, the web page including the shared web page that is shared on the user terminal and the customer terminal, displayed within a predetermined display area;
 a process for acquiring, from the user terminal and customer terminal that are mutually associated, a transition history of the shared web page that is based on manipulation of the user terminal or the customer terminal by performing regular polling and analyzing JavaScript installed in the browsers of the mutually associated user terminal and customer terminal;

a process that, on the basis of the transition history, when there is a transition of the shared web page on one of the user terminal or the customer terminal, synchronizes the shared web page on the other of the user terminal or the customer terminal with a post-transition web page as a new shared web page; and a process for referencing the text data storage means and deploying, on the web page on the user terminal, the reference data that are associated with the shared web page within the web page.

9. A computer program, embodied on a non-transitory computer medium, for enabling communication with a user terminal used by a user and a customer terminal used by a customer of the user over a network, and for causing a computer to include:

a text data storage means for associating and storing user identification information for identifying the user, text data registered by the user, the web page obtained by converting selected text data selected from the text data by the user, and reference data that only the user can consult for each web page; and a setup information storage means for mutually associating the user terminal and the customer terminal and storing the association to function as a communication support device for engaging in communication having a shared web page shared on the user terminal and the customer terminal, the program executing, on the computer:

a process for converting the selected text data selected from the text data by the user into a web page that constitutes the shared web page shared on the user terminal and the customer terminal;

a process for generating a web page deployed on the user terminal and the customer terminal that are mutually associated, the web page including the shared web page that is shared on the user terminal and the customer terminal displayed within a predetermined display area;

a process for acquiring, from the user terminal and the customer terminal that are mutually associated, a transition history of the shared web page that is based on manipulation of the user terminal or the customer terminal by performing regular polling and analyzing JavaScript installed in the browsers of the mutually associated user terminal and the customer terminal;

a process that, on the basis of the transition history, when there is a transition of the shared web page on one of the user terminal or the customer terminal, synchronizes the shared web page on the other of the user terminal or the customer terminal with a post-transition web page as a new shared web page; and a process for referencing the text data storage means and deploying, on the web page on the user terminal, the reference data that are associated with the shared web page within the web page.

* * * * *